(12) United States Patent
Nagaraj et al.

(10) Patent No.: US 12,732,662 B2
(45) Date of Patent: Sep. 8, 2026

(54) TELEVISION BASED CONSUMER OR TRAVEL RECOMMENDATIONS IN A MEDIA PLATFORM

(71) Applicant: Google LLC, Mountain View, CA (US)

(72) Inventors: Ajay Karthik Nama Nagaraj, Bangalore (IN); Vasudha Gupta, Ghaziabad (IN); Shatakshi Gupta, Mathura (IN); Netri, South West Delhi (IN); Parantap Sharma, Jaipur (IN); Kanishka Mishra, Bangalore (IN); Veenu Mishra, Delhi (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/421,874

(22) Filed: Jan. 24, 2024

(65) Prior Publication Data

US 2025/0240486 A1 Jul. 24, 2025

(51) Int. Cl.

| | |
|---|---|
| ***H04N 21/462*** | (2011.01) |
| ***G06F 16/95*** | (2019.01) |
| ***G06F 16/9538*** | (2019.01) |
| ***G06V 10/70*** | (2022.01) |
| ***H04N 21/478*** | (2011.01) |

(52) U.S. Cl.

CPC ..... *H04N 21/4622* (2013.01); *G06F 16/9538* (2019.01); *G06V 10/70* (2022.01); *H04N 21/47815* (2013.01)

(58) Field of Classification Search

CPC ......... H04N 21/47815; H04N 21/2542; H04N 21/4316; H04N 21/4782; G06F 16/9538; G06V 10/70

See application file for complete search history.

(56) References Cited

U.S. PATENT DOCUMENTS

2001/0052133 A1* 12/2001 Pack .................. H04N 21/8352 348/E7.071
2010/0312596 A1 12/2010 Saffari et al.
2011/0246471 A1* 10/2011 Rakib .................... G11B 27/28 707/769
2011/0296463 A1* 12/2011 Suslov .................... G06F 16/25 707/E17.014
2012/0167146 A1 6/2012 Incorvia
2014/0244488 A1 8/2014 Kim et al.
2014/0310752 A1 10/2014 Lam et al.

(Continued)

OTHER PUBLICATIONS

"Flipkart Rolls out New Technology and Design Upgrades on the App Ahead of Big Billion Sale", TimesNow, https://www.timesnownews.com/technology-science/flipkart-rolls-out-new-technology-and-design-upgrades-on-the-app-ahead-of-big-billion-salearticle-94095282, Sep. 9, 2022, 7 pages.

(Continued)

*Primary Examiner* — Nnenna N Ekpo
(74) *Attorney, Agent, or Firm* — Brake Hughes Bellermann LLP

(57) ABSTRACT

A device may detect an object in a media content item that is displayed on a display device. A device may retrieve search results for the object. A device may generate a ranked list by ranking the search results according to a plurality of signals. A device may initiate display of the ranked list on a user interface of the display device. In response to selection of a search result from the ranked list, a device may pause playback of the media content item and render a webpage that corresponds to the selected search result.

20 Claims, 7 Drawing Sheets

(56) References Cited

U.S. PATENT DOCUMENTS

| | | | | |
|---|---|---|---|---|
| 2016/0112394 | A1* | 4/2016 | Sahu | H04L 63/102 726/7 |
| 2016/0261921 | A1 | 9/2016 | Malko | |
| 2018/0359535 | A1 | 12/2018 | Hasek et al. | |
| 2019/0205834 | A1* | 7/2019 | Bell | G06Q 10/08355 |
| 2022/0129958 | A1* | 4/2022 | Kirwin | G06F 40/30 |
| 2022/0215970 | A1* | 7/2022 | Trpkovski | G07C 9/00904 |
| 2024/0355311 | A1* | 10/2024 | Yu | G10H 7/08 |
| 2025/0111928 | A1* | 4/2025 | Takemura | G16H 20/70 |

OTHER PUBLICATIONS

Greenfield, “Connected TV is Shoppable TV”, https://mountain.com/blog/ctv-shoppable-ads/, originally downloaded May 8, 2023, 6 pages.

Malik, “Former Prime Video exec launches Trendio, a video shopping app aiming to reimagine beauty ecommerce”, https://techcrunch.com/2022/12/15/former-prime-video-exec-launches-trendio-video-shopping-app/, Dec. 15, 2022, 5 pages.

* cited by examiner

116
UI 164
Streamed Content
Search Results 136

195
116
UI 164
Streamed Content
Search Results 136

TELEVISION BASED CONSUMER OR TRAVEL RECOMMENDATIONS IN A MEDIA PLATFORM

BACKGROUND

Conventional streaming platforms enable users to stream a variety of programs (e.g., movies, shows, live content, etc.) to their streaming devices, and users may be influenced by the content they watch on their devices. If a user views an item in a program that they would like to purchase or a place they would like to visit, a user may pause the program and/or look up the items or places on a device, which may remove the user from the streaming application.

SUMMARY

In some aspects, the techniques described herein relate to a method including: identifying an object in a media content item that is displayed on a display device; retrieving a set of search results for the object; initiating display of the set of search results on a user interface of the display device; and in response to selection of a search result from the set of search results: pausing playback of the media content item; and rendering a webpage that corresponds to the selected search result.

In some aspects, the techniques described herein relate to a display device including: at least one processor; and a non-transitory computer-readable medium storing executable instructions that when executed by the at least one processor cause the at least one processor to: identify an object in a media content item that is displayed on a display device; retrieve a set of search results for the object; generate a ranked list by ranking the search results according to a plurality of signals; initiate display of the ranked list on a user interface of the display device; and in response to selection of a search result from the set of search results: pause playback of the media content item; and render a webpage that corresponds to the selected search result.

In some aspects, the techniques described herein relate to a non-transitory computer-readable medium storing executable instructions that when executed by at least one processor cause the at least one processor to execute operations, the operations including: identifying an object in a media content item that is displayed on a display device; retrieving a set of search results for the object; initiating display of the set of search results on a user interface of the display device; and in response to selection of a search result from the set of search results: pausing playback of the media content item; and rendering a webpage that corresponds to the selected search result.

The details of one or more implementations are set forth in the accompanying drawings and the description below. Other features will be apparent from the description and drawings, and from the claims.

DETAILED DESCRIPTION

Figure 1A:
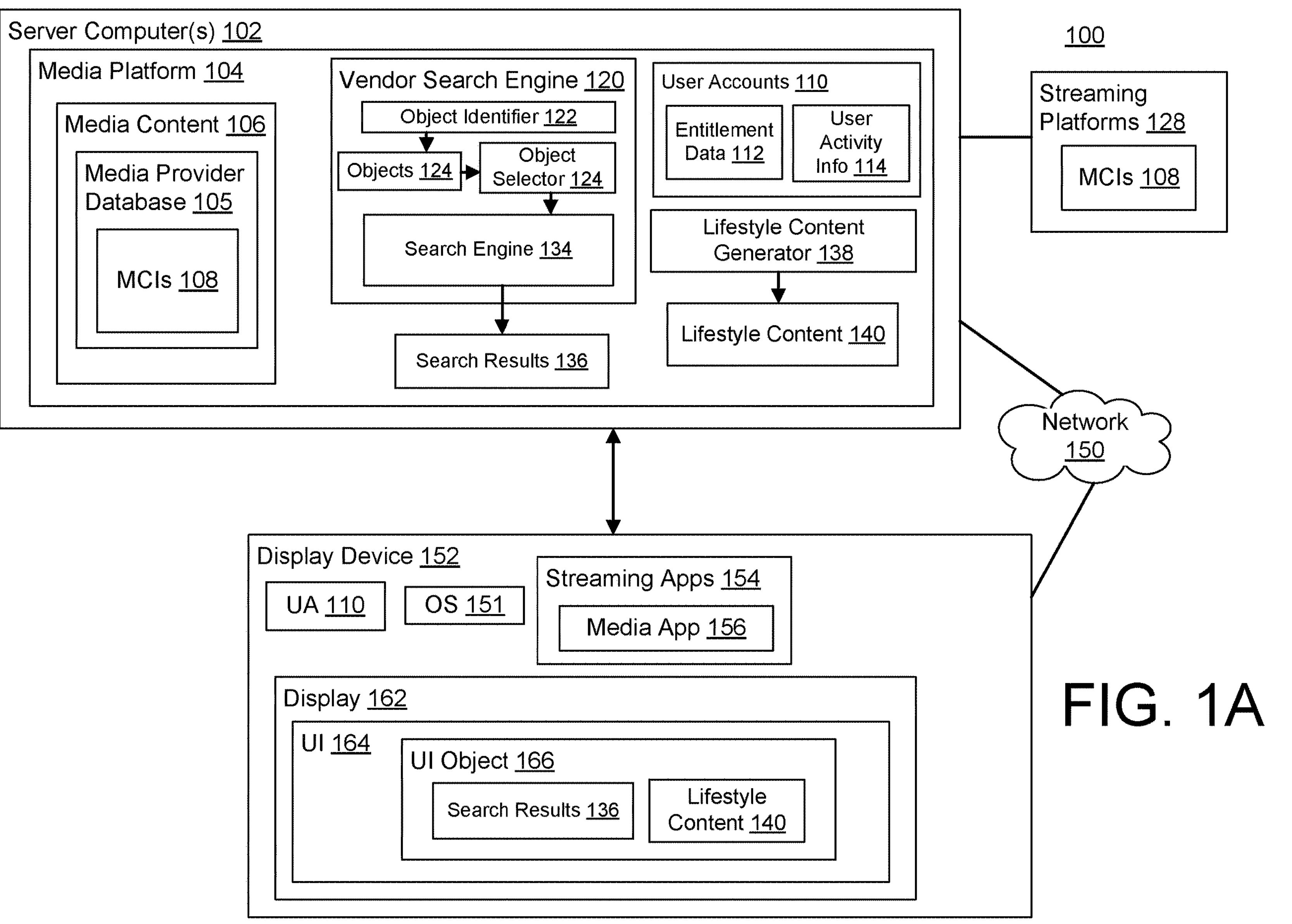
FIG. 1A illustrates a streaming system that detects objects in video and retrieves search results to view and/or purchase those objects according to an aspect.

This disclosure relates to a system configured to identify objects (e.g., items, places, etc.) in scenes of a media content item (e.g., a movie, show, live content, etc.), obtain search results for the objects, and provide those search results to a user interface of a media application (e.g., a streaming application). In some examples, the objects are identified in real-time (e.g., as the user is watching the media content item). In some examples, the system processes (e.g., analyzes) the media content item (e.g., before viewing) and stores the identified objects. In some examples, the system may rank and/or the search results based on a plurality of signals such as availability of the vender in the user's region, location of the vendor (e.g., nearest vendor may be given more preference), an item's cost, popularity of vendor, and/or user's past activity (e.g., whether the user has purchased items using the vendor).

A media application, executable by a display device, renders a user interface that identifies a plurality of media content items that are available for streaming on the display device. A media content item may be a show, program, movie, etc. Selection of a media content item from the application's user interface causes the media content item to be streamed on the display device. For example, in response to selection of a media content item from the user interface, the media application may initiate playback of the media content item. In some examples, the system may enable the real-time detection of objects in media content items streamed from a streaming platform and provides identification of vendors (e.g., search results (e.g., shopping search results)) to enable the user to potentially purchase the objects.

In some examples, the system displays the search results to the user on a user interface of a media application while the user is watching the media content item. In some examples, the system collects the search results and displays the search results in a separate tab at the end of the media content item (e.g., after the user has watched the media content item). A search result may be selected by a user to purchase an object and/or view additional information about the object. For example, selection of a search result from the user interface of the media application may cause the system to display a webpage associated with the object (e.g., a vendor's webpage of the object or information page about the object). If the selection of a search result occurs while the media content item is currently being played back, the system may pause replay of the media content item and initiate display of the webpage associated with a selected search result. In some examples, the system may initiate a browser application and the webpage associated with the selected search result may be displayed in a user interface of the browser application.

In some examples, the system includes a lifestyle content generator configured to generate lifestyle content for display in the user interface of the media application. The lifestyle content may include content across several categories such as fashion brands, home décor, cooking, travel, art, theater, makeup tutorials. In some examples, the system displays the lifestyle content in a separate tab on the user interface of the media application. In some examples, the system displays the lifestyle content as a horizontal carousel on the top of the tab. In some examples, the tab includes content rows categorized by different genres. In some examples, the lifestyle content may include resource identifiers (e.g., HTML links), which, when selected, initiates the display webpages of vendors of items included in the lifestyle. In some examples, the lifestyle content is ranked according to user clicks on each category. These and other features are further described with reference to the figures.

FIGS. 1A to 1G illustrates a system 100 that identifies objects 124 (e.g., items 124*a*, places 124*b*, etc.) in scenes of a media content item 108 (e.g., a movie, show, live content, etc.), obtains search results 136 for the objects 124, and provides those search results 136 to a user interface 164 of a media application 156 (e.g., a streaming application). In some examples, the objects 124 are identified in real-time (e.g., as the user is watching the media content item 108) (e.g., see FIG. 1B). In some examples, the system 100 processes (e.g., analyzes) the media content item 108 (e.g., before viewing) and stores information about the objects 124 for later retrieval. In some examples, the system 100 may rank the search results 136 based on a plurality of signals 170 such as availability of the vender in the user's region, location of vendor (e.g., nearest vendor may be given more preference), item costs, popularity of vendor, and/or user's past activity (e.g., whether the user has purchased items using the vendor).

In some examples, the system 100 displays the search results 136 to the user on the user interface 164 of a media application 156 while the user is watching the media content item 108. In some examples, the system 100 collects the search results 136 and displays the search results 136 in a separate tab after the media content item 108 has ended (e.g., after the user has watched the media content item 108). A search result 136 may be selected by a user to purchase an object 124 and/or view additional information about the object 124. For example, selection of a search result 136 from the user interface 164 of the media application 156 may cause the system 100 to display a webpage associated with the object 124 (e.g., a vendor's webpage of the object 124 or information page about the object 124). If the selection of a search result 136 occurs while the media content item 108 is currently being played back, the system 100 may pause replay of the media content item 108 and initiate display of the webpage associated with a selected search result 136.

In some examples, the system 100 includes a lifestyle content generator 138 configured to generate lifestyle content 140 for display in the user interface 164 of the media application 156. The lifestyle content 140 may include content across several categories such as fashion brands, home décor, cooking, travel, art, theater, makeup tutorials. In some examples, the system 100 displays the lifestyle content 140 in a separate tab on the user interface 164 of the media application 156. In some examples, the system 100 displays the lifestyle content 140 as a horizontal carousel on the top of the tab. In some examples, the tab includes content rows categorized by different genres. In some examples, the lifestyle content 140 may include resource identifiers (e.g., HTML links), which, when selected, initiates display webpages of vendors of items included in the lifestyle content 140. In some examples, the lifestyle content 140 is ranked according to user clicks on each category.

The system 100 includes a media platform 104 executable by one or more server computers 102 and a media application 156 executable by a display device 152. The media platform 104 may be a server-based television or streaming platform. In some examples, the media application 156 is (or is a subcomponent of) an operating system 151 of the display device 152. In some examples, the media application 156 is a native application (e.g., a standalone native application), which is preinstalled on the display device 152 or downloaded to the display device 152 from a digital media store (e.g., play store, application store, etc.). The media application 156 may communicate with the media platform 104 to identify media content 106 that is available for streaming to the display device 152. The media content 106 includes a plurality of media content items 108. In some examples, the media content 106 includes media content items 108 that are stored on the media platform 104 and streamed from the media platform 104 to the media application 156. In some examples, the media content 106 includes media content items 108 that are stored on one or more (other) streaming platforms 128 and streamed from the streaming platforms 128 to their respective streaming applications 154.

In some examples, the media application 156 is a media aggregator application that determines which providers (e.g., streaming platforms 128, associated streaming applications 154) the user has access rights to, and then identifies media content items 108, across those providers, in the user interface 164 for selection and playback. For example, the media application 156 (e.g., in conjunction with the media platform 104) may aggregate (e.g., combine, assemble, collect, etc.) information about media content 106 available for viewing (e.g., streaming) from multiple streaming platforms 128 and present the information in the user interface 164 (e.g., a single, unified user interface) so that a user can identify and/or search media content 106 across different streaming platforms (e.g., without having to search within each streaming application 154). In some examples, the media content 106 is referred to as media content items 108 (e.g., individual programs offered by streaming platforms 128). For example, each media content item 108 may be a program (e.g., a television show, a movie, a live broadcast, etc.) from the media platform 104 or another streaming platform 128. Instead of searching for media content items 108 on a first streaming application and media content items 108 on a second streaming application, the media application 156 may combine the media content items 108 together in one interface (e.g., user interface 164) so that a user can search across multiple streaming platforms 128 at once.

In some examples, a media content item 108 may correspond to a digital video file, which may be stored on the streaming platforms 128 (including the media platform 104) and/or the display device 152. In some examples, the media platform 104 is also considered a streaming platform 128, which may store and provide digital video files for streaming or downloading. The digital video file may include video and/or audio data that corresponds to a particular media content item 108. In some examples, the media platform 104 is configured to communicate with the streaming platforms 128 to identify which media content 106 is available on the streaming platforms 128 and may update a media provider database 105 to identify the media content items 108 offered by the streaming platforms 128.

For example, the media platform 104 may communicate, over a network 150, with the streaming platforms 128 to identify which media content 106 is available to be streamed by display devices 152 and update a media provider database 105. The media platform 104 may identify a set or multiple sets of media content items 108 (e.g., across the various streaming platforms 128) as recommendations to a user of the media application 156. In some examples, the media platform 104 may determine whether the user of the media application 156 has rights (e.g., stored as entitlement data 112) to stream media content 106 from one or more of the streaming platforms 128 (e.g., whether the user has subscribed to access media content 106 from the streaming platform(s) 128), and, if so, may include those media content items 108 as candidates in a selection (e.g., ranking) mechanism to potentially be displayed in the user interface 164 of the media application 156.

The media application 156 includes a user interface 164 that identifies media content items 108 for selection and playback on the display device 152. In response to selection of a media content item 108, the media application 156 may initiate playback of the media content item 108 on a display 162 of the display device 152. In some examples, in response to selection of the media content item 108, the media platform 104 streams the media content item 108 to the media application 156, which causes the media application 156 to display the media content item 108 on the display 162. In some examples, in response to selection of the media content item 108 from the user interface 164 of the media application 156, the media application 156 causes the content's underlying streaming application 156 to playback the media content item 108.

In some examples, selection of a media content item 108 from the user interface 164 may cause the media application 156 to launch a streaming application 154 (e.g., using a content deep link) associated with the streaming application 154. In some examples, selection of a media content item 108 from the user interface 164 causes the media application 156 to render another user interface (e.g., item's landing page), and further selection of the media content item 108 from the item's landing page causes the media application 156 to launch the underlying streaming application 154. In some examples, the media content item 108 may be associated with a specific provider in which the media content item 108 is streamed from a streaming platform 128 (e.g., the media platform 104 itself or another streaming platform 128). In some examples, the user can control the playback of the media content item 108 from the corresponding streaming application 154.

A content deep link, corresponding to a media content item 108, may be an identifier that identifies the location of the media content item 108 in the streaming application 154. The media application 156 may transfer the content deep link to the corresponding streaming application 154. In some examples, the content deep link identifies a specific landing page (e.g., an interface) within the streaming application 154 that corresponds to the media content item 108. In some examples, the content deep link is an operating system intent. In some examples, the content deep link is a uniform resource locator (URL). In some examples, the content deep link includes a URL format.

Streaming (or playback) of the media content item 108 may refer to the transmission of the contents of a video file (e.g., media assets) from a streaming platform 128 or the media platform 104 to the display device 152 that displays the contents of the video file. In some examples, streaming (or playback) of the media content item 108 may refer to a continuous video stream that is transferred from one place to another place in which a received portion of the video stream is displayed while waiting for other portions of the video stream to be transferred. In some examples, after the media content item 108 is published on the media platform 104 (e.g., is live), the display device 152 may stream or download the contents of the video file.

In some examples, the user interface 164 may identify a plurality of media content items 108, which may be selected by the media platform 104 from the media provider database 105 based at least in part on information representing the user's interests and activities (e.g., the user's search queries, search results, previous watch history, purchase history, application usage history, application installation history, user actions on the network-connected display device, physical activities of the user, etc.). In some examples, the media application 156 may be associated with a user account 110, and the user account 110 may store the information representing the user's interests and activities (e.g., user activity information 114), and the media platform 104 may use this information to select and present the media content items 108 in the user interface 164. In some examples, the media content items 108 may be organized as a plurality of clusters based on one or more categories, such as content type (e.g., "Action Movies"), viewing history (e.g., "Because You watched Movie ABC"), release time (e.g., "Trending"), and the like. In some examples, the media content items 108 provided by different streaming platforms 128 (e.g., action movies from two different streaming platforms 128) can be recommended in the same cluster. In some examples, the user interface 164 may include tabbed interfaces, where one of the tabbed interfaces includes personalized media content that is organized as a plurality of clusters based on one or more categories, such as release time (e.g., "This Week," "Next week," "Next Month," etc.), user action and user application interaction, native app usage (e.g., items that are "From App ABC"), etc. In some examples, one of the tabs includes the lifestyle content 140 (e.g., a lifestyle content tab).

It is noted that a user of the media application 156 may be provided with controls allowing the user to make an election as to both if and when the system 100 may enable the collection of information representing the user's interests and activities. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user of the media application 156 may have control over what information is collected about the user, how that information is used, and what information is provided to the user and/or to the server computer 102.

The media platform 104 may store user accounts 110, where each user account 110 stores information about a respective user. A user account 110 may store entitlement data 112 and/or user activity information 114. The entitlement data 112 includes information that identifies which providers (e.g., streaming platforms 128, streaming applications 154) that the user account 110 has access rights to view content. In some examples, the access rights are determined based on the user account 110 (e.g., whether the user has subscribed to one or more streaming applications 154), which streaming applications 154 are installed on the display device 152 and/or if the user has accessed (e.g., logged-into) a user account associated with those streaming applications 154. In response to certain user activity regarding media content items 108, the media platform 104 may update the user activity information 114 with information about the activity such as a content identifier 135, the date/time, and/or the watch duration of the media content item 108, etc.

In some examples, the media platform 104 includes a vendor search engine 120 configured to identify objects 124 in the content of media content items 108 and obtain search results 136 for the objects 124 identified in the media content items 108. In some examples, the media application 156 includes the vendor search engine 120. In some examples, the search results 136 are shopping results from an internet web browser. For example, when a user is watching a professional basketball game, the vendor search engine 120 may detect a basketball jersey of a particular player, and then identify one or more vendors (e.g., search results 136) that offer the basketball jersey for purchase. The search results 136 may be presented to the user while the user is watching the professional basketball game.

The vendor search engine 120 includes an object identifier 122 configured to identify objects 124 in a media content item 108. In some examples, the object identifier 122 is stored on the media platform 104. In some examples, the object identifier 122 is stored on the media application 156.

Figure 1B:
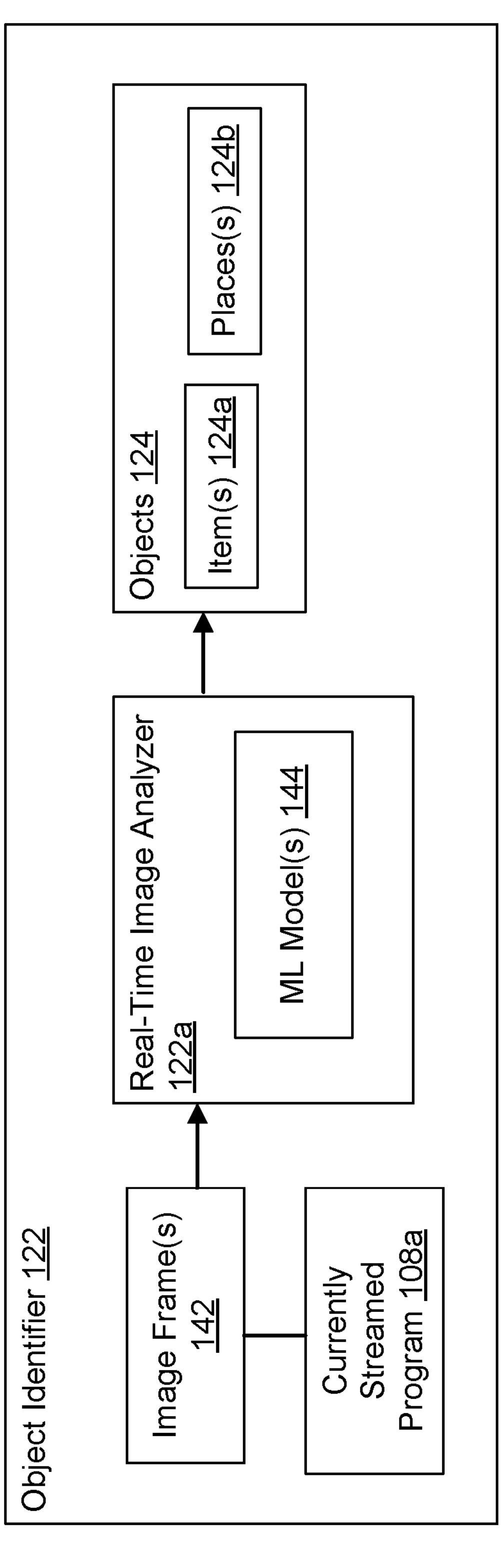
FIG. 1B illustrates an example of an object identifier according to an aspect.
Figure 1C:
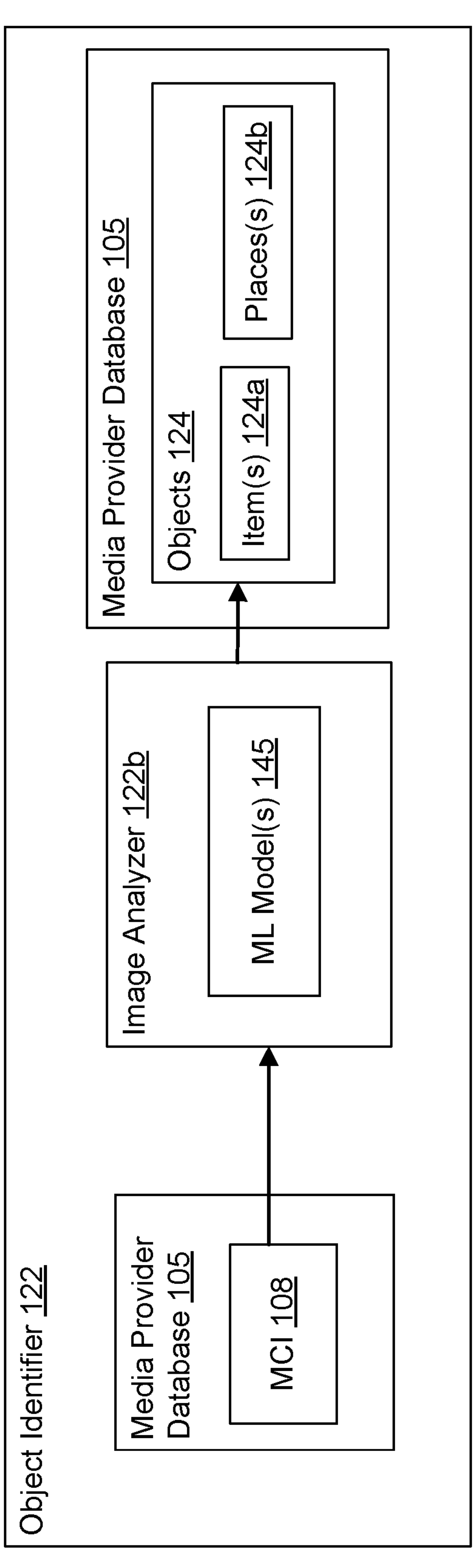
FIG. 1C illustrates an example of an object identifier according to another aspect.

The object identifier 122 may execute an image recognition algorithm that identifies objects 124 in a media content item 108. In some examples, the objects 124 include items 124*a*. Items 124*a* may be physical products in the media content item 108. In some examples, the objects 124 include places 124*b*. The places 124*b* may be physical geographical areas in the media content item 108. In some examples, as shown in FIG. 1B, the object identifier 122 includes a real-time image analyzer 122*a* configured to receive image frames 142 from a currently streamed program 108*a* (e.g., while the user is watching the currently streamed program 108*a*) and identify the objects 124 from the image frames 142. In some examples, the real-time image analyzer 122*a* includes one or more ML models 144. In some examples, as shown in FIG. 1C, the object identifier 122 includes an image analyzer 122*b* configured to receive a media content item 108 from the media provider database 10, identify the objects 124 in the media content item 108, and store identification of the objects 124 in the media provider database 105 in association with a particular media content item 108. In some examples, identification (e.g., names) of the objects 124 are stored as part of the metadata of a particular media content item 108.

Figure 1D:
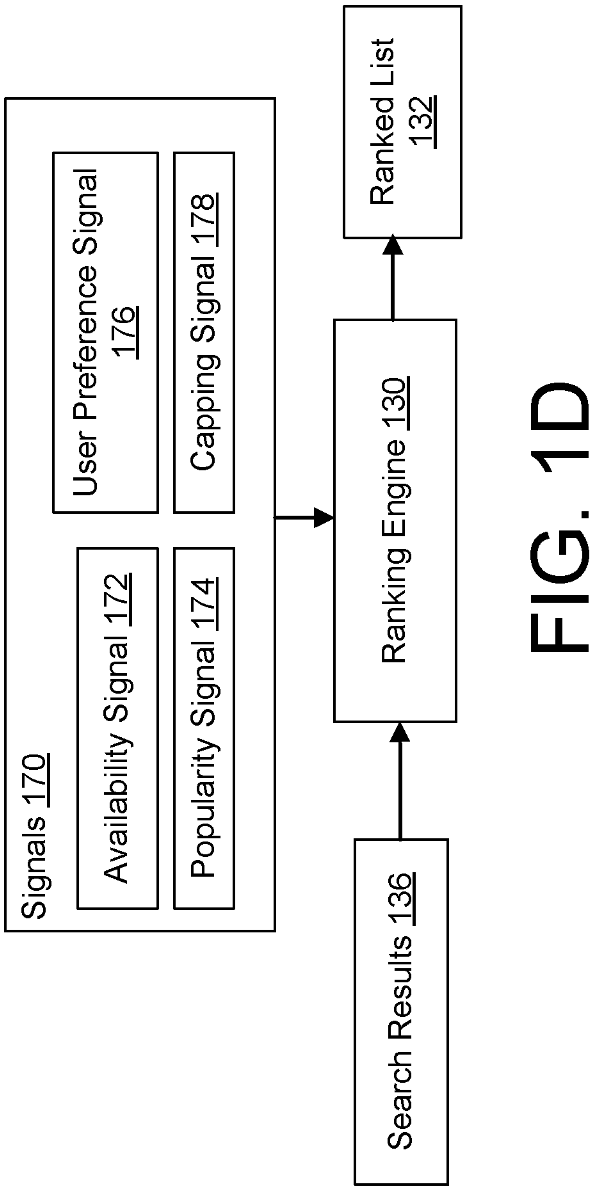
FIG. 1D illustrates an example of a ranking engine according to an aspect.

The vendor search engine 120 includes a search engine 134 configured to receive identification (e.g., names) of the objects 124 and obtain search results 136 that are responsive to the names of the objects 124. In some examples, the search engine 134 is stored at the media platform 104 or another server computer 102 that hosts the search engine 134. In some examples, the search engine 134 is stored at the display device 152. In some examples, the search engine 134 is a browser-based search engine that searches the internet for webpages that satisfy the search query (e.g., the names of the objects 124). In some examples, the search results 136 are shopping results that identify webpages of vendors. In some examples, as shown in FIG. 1D, the search engine 134 includes a ranking engine 130 that generates a ranked list 132 by ranking the search results 136 according to signals 170. In some examples, the signals 170 includes an availability signal 172 about an availability of a vendor, a popularity signal 174 about the popularity of a vendor, a user preference signal 176 that indicates one or more user preferences, and a capping signal 178 that restricts the number of displayed search results 136.

Figure 1E:
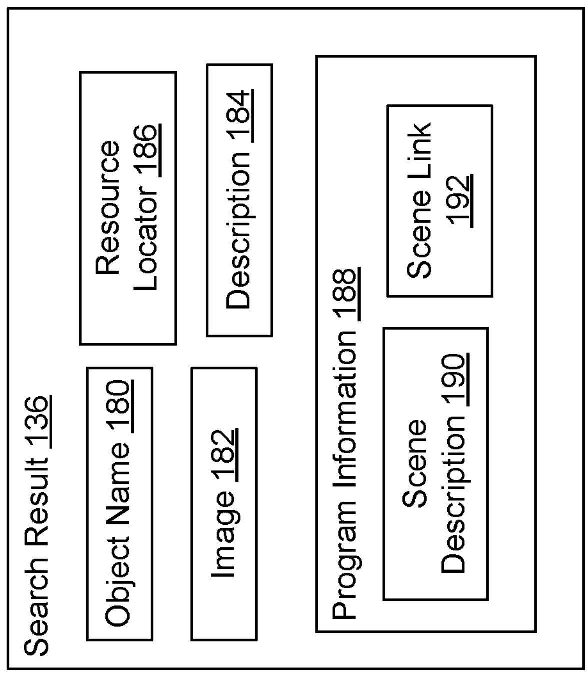
FIG. 1E illustrates an example of a search result according to an aspect.

As shown in FIG. 1E, a search result 136 may include an object name 180, an image 182 of the object, a resource locator 186 of a vendor's webpage, a description 184 of the object 124, and/or program information 188 about the object 124 in the media content item 108. The program information 188 may provide a scene description 190 about the object's depiction in the scene of the media content item 108 and/or a scene link 192, when selected, causes the media application 156 to playback from the media content item 108 from the start of the scene that includes the object 124.

Figures 1F, 1G:
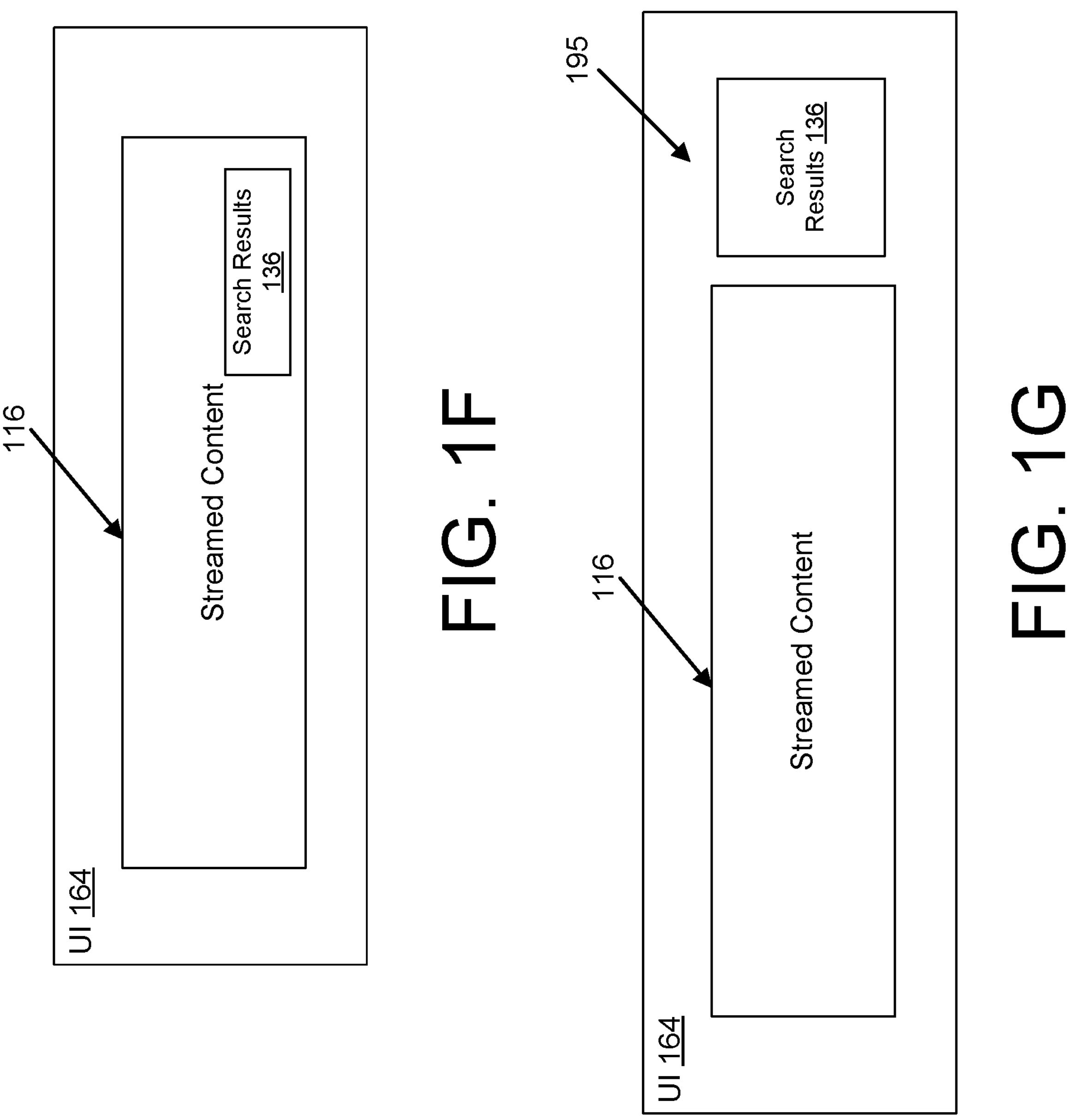
FIG. 1F illustrates an example of displaying search results on streamed content according to an aspect.
FIG. 1G illustrates an example of displaying search results in a section that is separate from the display of streamed content according to an aspect.

In some examples, as shown in FIG. 1F, the media application 154 overlies the search results 136 on the steamed content 116 (e.g., the image frames) of a media content item 108. In some examples, the media application 154 may position a search result 136 in a location that corresponds to a location of the object 124 in the streamed content 116. In some examples, as shown in FIG. 1G, the media application 154 may display the search results 136 in a section 195 that is separate from the streamed content 116 of the media content item 108.

The display device 152 includes one or more processors, one or more memory devices, and an operating system 151 configured to execute (or assist with executing) one or more streaming applications 154. The one or more memory devices may be a non-transitory computer-readable medium storing executable instructions that cause the one or more processors to execute operations discussed herein. The display device 152 may be any type of user device. In some examples, the display device 152 is a television device (e.g., a smart television). In some examples, the display device 152 is a smartphone, a laptop computer, a desktop computer, a gaming console, and/or a wearable device such as a head-mounted display device. In some examples, the display device 152 is an augmented reality (AR) or virtual reality (VR) device. The streaming applications 154 may include a media application 156 configured to communicate, over the network, 150, with a media platform 104 executable by one or more server computers 102. In some examples, the media application 156 is a program that is part of the operating system 151. In some examples, the media application 156 is a separate standalone application that is downloaded and installed on the operating system 151. In some examples, the media application 156 may execute operation(s) discussed with reference to the operating system 151 (and/or vice versa). In some examples, the display device 152 is not a smart television, but is converted to a smart television when connected to a casting device, where the casting device is configured to connect to the network 150 and execute an operating system 151 configured to execute streaming applications 154, including the media application 156.

In some examples, the operating system 151 is a browser application. A browser application is a web browser configured to access information on the Internet and may launch one or more browser tabs in the context of one or more browser windows. In some examples, the operating system 151 is a Linux-based operating system. In some examples, the operating system 151 is a mobile operating system that is also configured to execute on smaller devices (e.g., smartphones, tablets, wearables, etc.).

The server computer 102 may be computing devices that take the form of a number of different devices, for example a standard server, a group of such servers, or a rack server system. In some examples, the server computer 102 may be a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer 102 may include one or more processors formed in a substrate, an operating system (not shown) and one or more memory devices. The memory devices may represent any kind of (or multiple kinds of) memory (e.g., RAM, flash, cache, disk, tape, etc.). In some examples (not shown), the memory devices may include external storage, e.g., memory physically remote from but accessible by the server computer 102. The server computer 102 may include one or more modules or engines representing specially programmed software.

Figure 2:
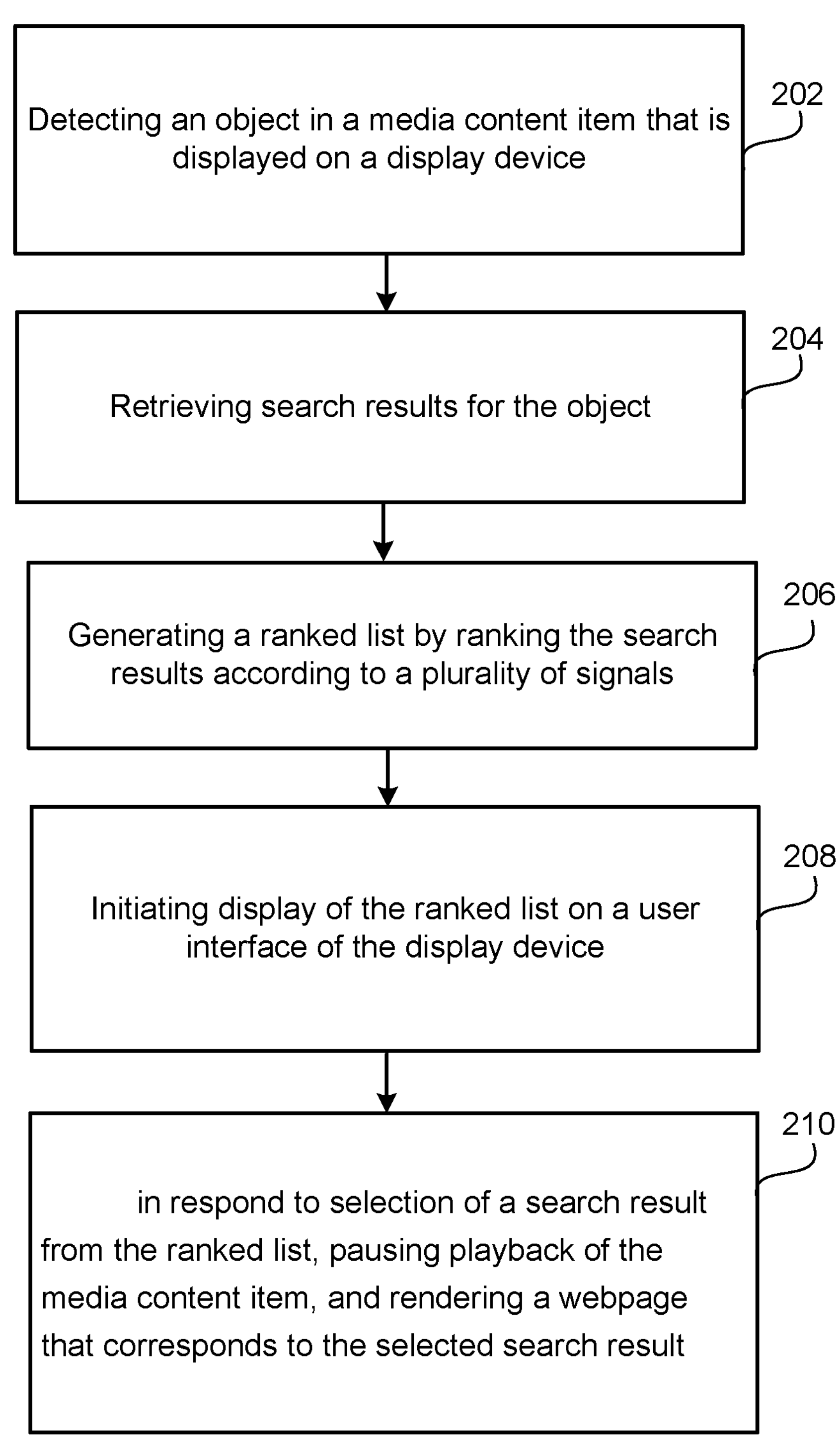
FIG. 2 is a flowchart depicting example operations of identifying objects in a media content item and generating search results for those objects according to an aspect.

FIG. 2 is a flowchart 200 depicting example operations of a system that identifies objects in media content items, obtains search results for those objects, and displays the search results in a user interface of a media application. The flowchart 200 may depict operations of a computer-implemented method. The flowchart 200 may depict operations of a non-transitory computer-readable medium having executable instructions that when executed by one or more processors cause the one or more processors to execute the operations of the flowchart 200. Although the flowchart 200 is explained with respect to the system 100 of FIGS. 1A to 1G, the flowchart 200 may be applicable to any of the implementations discussed herein. Although the flowchart 200 of FIG. 2 illustrates the operations in sequential order, it will be appreciated that this is merely an example, and that additional or alternative operations may be included. Further, operations of FIG. 2 and related operations may be executed in a different order than that shown, or in a parallel or overlapping fashion.

Operation 202 includes detecting an object in a media content item that is displayed on a display device. Operation 204 includes retrieving search results for the object. Operation 206 includes generating a ranked list by ranking the search results according to a plurality of signals. Operation 208 includes initiating display of the ranked list on a user interface of the display device. Operation 210 includes, in response to selection of a search result from the ranked list, pausing playback of the media content item, and rendering a webpage that corresponds to the selected search result.

Clause 1. A method comprising: identifying an object in a media content item that is displayed on a display device; retrieving a set of search results for the object; initiating display of the set of search results on a user interface of the display device; and in response to selection of a search result from the set of search results: pausing playback of the media content item; and rendering a webpage that corresponds to the selected search result.

Clause 2. The method of clause 1, further comprising: generating a ranked list by ranking the search results according to a plurality of signals, wherein the ranked list is displayed on the user interface.

Clause 3. The method of clause 2, wherein the plurality of signals include an availability signal indicating an availability of a vendor of the object.

Clause 4. The method of clause 2, wherein the plurality of signals include a popularity signal indicating a popularity of a vendor of the object.

Clause 5. The method of clause 1, wherein the identifying the object in the media content item includes generating, using a machine-learning (ML) model, an object name of the object by analyzing one or more image frames of the media content item in real-time.

Clause 6. The method of clause 1, wherein the identifying the object in the media content item includes retrieving an object name of the object from a media provider database.

Clause 7. The method of clause 1, wherein the search result includes an object name, a resource locator, and a description.

Clause 8. The method of clause 1, wherein the search result includes a scene description about a scene that includes the object.

Clause 9. The method of clause 1, wherein the set of search results is displayed such that the set of search results is overlaid on streamed content of the media content item.

Clause 10. The method of clause 1, wherein the set of search results is displayed in a section of the user interface that is separate from streamed content of the media content item.

Clause 11. A display device comprising: at least one processor; and a non-transitory computer-readable medium storing executable instructions that when executed by the at least one processor cause the at least one processor to: identify an object in a media content item that is displayed on a display device; retrieve a set of search results for the object; generate a ranked list by ranking the search results according to a plurality of signals; initiate display of the ranked list on a user interface of the display device; and in response to selection of a search result from the set of search results: pause playback of the media content item; and render a webpage that corresponds to the selected search result.

Clause 12. The display device of clause 11, wherein the plurality of signals include an availability signal indicating an availability of a vendor of the object, a popularity signal indicating a popularity of the vendor of the object, and a user preference signal indicating a user's preference for the vendor of the object.

Clause 13. The display device of clause 11, wherein the executable instructions include instructions that cause the at least one processor to: generate, using a machine-learning (ML) model, an object name of the object by analyzing one or more image frames of the media content item in real-time.

Clause 14. The display device of clause 11, wherein the executable instructions include instructions that cause the at least one processor to: retrieve an object name of the object from a media provider database.

Clause 15. The display device of clause 11, wherein the search result includes an object name, a resource locator, a description, and a scene description about a scene that includes the object.

Clause 16. A non-transitory computer-readable medium storing executable instructions that when executed by at least one processor cause the at least one processor to execute operations, the operations comprising: identifying an object in a media content item that is displayed on a display device; retrieving a set of search results for the object; initiating display of the set of search results on a user interface of the display device; and in response to selection of a search result from the set of search results: pausing playback of the media content item; and rendering a webpage that corresponds to the selected search result.

Clause 17. The non-transitory computer-readable medium of clause 16, wherein the operations further comprise: generating a ranked list by ranking the search results according to a plurality of signals, wherein the ranked list is displayed on the user interface.

Clause 18. The non-transitory computer-readable medium of clause 17, wherein the plurality of signals include an availability signal indicating an availability of a vendor of the object, a popularity signal indicating a popularity of the vendor of the object, and a user preference signal indicating a user's preference for the vendor of the object.

Clause 19. The non-transitory computer-readable medium of clause 16, wherein the operations further comprise: generating, using a machine-learning (ML) model, an object name of the object by analyzing one or more image frames of the media content item in real-time.

Clause 20. The non-transitory computer-readable medium of clause 16, wherein the operations further comprise: retrieving an object name of the object from a media provider database.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are remote from each other and typically interact through a communication network. The relationship of client and server arises by virtue of computer programs running on the respective computers and having a client-server relationship with each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:

playing a media content item in a first tab of a user interface of a media application executing on a display device;

identifying an object in the media content item while the media content item is playing;

in response to determining that the playing of the media content item has ended:

retrieving a set of search results for the object; and initiating display of the set of search results in a second tab of the user interface of the media application;

in response to selection of a search result from the set of search results, rendering a webpage that corresponds to the selected search result in a third tab of the user interface of the media application;

categorizing lifestyle content into a plurality of categories ranked according to a user clicks on each category; and displaying the plurality of categories of the lifestyle content as ranked according to user clicks on each category as a horizontal carousel on a top of a fourth tab of the user interface, the lifestyle content related to at least one of a fashion brand, home décor, cooking, travel, art, heater, or makeup tutorials.

2. The method of claim 1, further comprising:

generating a ranked list by ranking the search results according to a plurality of signals, wherein the ranked list is displayed on the user interface.

3. The method of claim 2, wherein the plurality of signals include at least one of an availability signal indicating an availability of a vendor of the object and a popularity signal indicating a popularity of a vendor of the object.

4. The method of claim 1, wherein the identifying the object in the media content item includes generating, using a machine-learning (ML) model, an object name of the object by analyzing one or more image frames of the media content item in real-time.

5. The method of claim 1, wherein the identifying the object in the media content item includes retrieving an object name of the object from a media provider database.

6. The method of claim 1, wherein the search result includes an object name, a resource locator, and a description.

7. The method of claim 1, wherein the search result includes program information about the object in the media content item, the program information including a scene description about a scene that includes the object.

8. The method of claim 1, wherein the set of search results is displayed such that the set of search results is overlaid on streamed content of the media content item.

9. The method of claim 1, wherein the set of search results is displayed in a section of the user interface that is separate from streamed content of the media content item.

10. A display device comprising:

at least one processor; and a non-transitory computer-readable medium storing executable instructions that when executed by the at least one processor cause the at least one processor to:

play a media content item in a first tab of a user interface of a media application executing on the display device;

identify an object in the media content item while the media content item is playing;

in response to determining that the playing of the media content item has ended:

retrieve a set of search results for the object, and initiate display of the search results in a second tab of the user interface of the media application;

in response to selection of a search result from the set of search results, render a webpage that corresponds to the selected search result in a third tab of the user interface of the media application;

categorize lifestyle content into a plurality of categories ranked according to user clicks on each category; and display the plurality of categories of the lifestyle content as ranked according to user clicks on each category as a horizontal carousel on a top of a fourth tab of the user interface, the lifestyle content related to at least one of a fashion brand, home decor, cooking, travel, art, theater, or makeup tutorials.

11. The display device of claim 10, wherein the executable instructions include instructions that cause the at least one processor to generate a ranked list by ranking the search results according to a plurality of signals, wherein the ranked list is displayed on the user interface; and wherein the plurality of signals include an availability signal indicating an availability of a vendor of the object, a popularity signal indicating a popularity of the vendor of the object, and a user preference signal indicating a user's preference for the vendor of the object.

12. The display device of claim 10, wherein the executable instructions include instructions that cause the at least one processor to:

generate, using a machine-learning (ML) model, an object name of the object by analyzing one or more image frames of the media content item in real-time.

13. The display device of claim 10, wherein the executable instructions include instructions that cause the at least one processor to:

retrieve an object name of the object from a media provider database.

14. The display device of claim 10, wherein the search result includes an object name, a resource locator, a description, and a scene description about a scene that includes the object.

15. A non-transitory computer-readable medium storing executable instructions that when executed by at least one processor cause the at least one processor to execute operations, the operations comprising:

playing a media content item in a first tab of a user interface of a media application executing on a display device;

identifying an object in the media content item while the media content item is playing;

in response to determining that the playing of the media content item has ended:

retrieving a set of search results for the object, and initiating display of the set of search results in a second tab of the user interface of the media application;

in response to selection of a search result from the set of search results, rendering a webpage that corresponds to the selected search result in a third tab of the user interface of the media application;

categorizing lifestyle content into a plurality of categories ranked according to user clicks on each category; and displaying the plurality of categories of the lifestyle content as ranked according to user clicks on each category as a horizontal carousel on a top of a fourth tab of the user interface, the lifestyle content related to at least one of a fashion brand, home decor, cooking, travel, art, theater, or makeup tutorials.

16. The non-transitory computer-readable medium of claim 15, wherein the operations further comprise:

generating a ranked list by ranking the search results according to a plurality of signals, wherein the ranked list is displayed on the user interface.

17. The non-transitory computer-readable medium of claim 16, wherein the plurality of signals include an availability signal indicating an availability of a vendor of the object, a popularity signal indicating a popularity of the vendor of the object, and a user preference signal indicating a user's preference for the vendor of the object.

18. The non-transitory computer-readable medium of claim 15, wherein the operations further comprise:

generating, using a machine-learning (ML) model, an object name of the object by analyzing one or more image frames of the media content item in real-time.

19. The non-transitory computer-readable medium of claim 15, wherein the lifestyle content is categorized by a plurality of categories and is ranked according to user clicks on each category.

20. The method of claim 7, wherein the program information further includes a scene link; and wherein the method further includes, in response to receiving an indication of a selection of the scene link, causing playback of the media content item from a start of the scene that includes the object by the media application.

* * * * *